June 1, 1937.  R. D. AMSDEN  2,082,607
ELECTRICAL CONTROL SYSTEM
Filed May 27, 1936  2 Sheets-Sheet 1
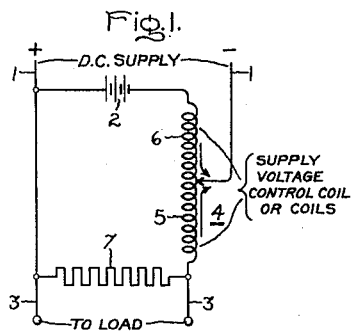
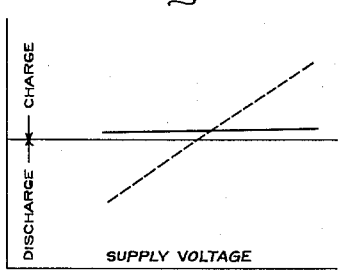
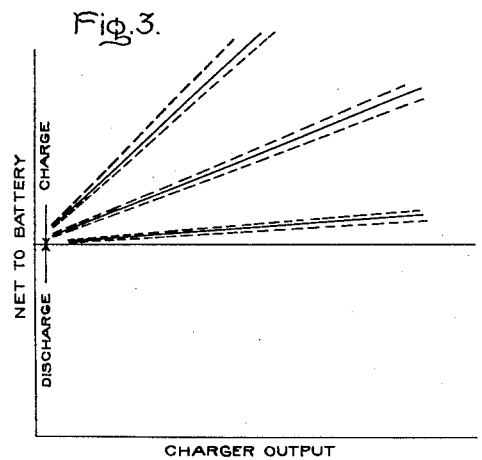
Inventor:
Ralph D. Amsden,
by Harry E. Dunham
His Attorney.

Inventor:
Ralph D. Amsden,
by Harry E. Dunham
His Attorney.

Patented June 1, 1937

2,082,607

UNITED STATES PATENT OFFICE 2,082,607

ELECTRICAL CONTROL SYSTEM

Ralph D. Amsden, Lynn, Mass., assignor to General Electric Company, a corporation of New York Application May 27, 1936, Serial No. 82,037

10 Claims. (Cl. 171—314)

My invention relates to electrical control systems and more particularly to improvements in the automatic control of electrical energy supply systems of the type that are provided with a storage battery which is charged by the system and which also supplies current to the load when the main source of current supply is not available.

There are many cases where it is extremely important that the supply of current to a load circuit should be of the utmost dependability. Examples of such cases are emergency lighting systems for theatres and other public buildings, signal bell systems in schools and railway track signal systems. In such systems the main source of current supply is usually an ordinary, commercially constant, moderately variable voltage supply circuit, such as an ordinary 110 volt alternating current house lighting circuit, and in order to secure reliability and continuity of operation a storage battery is provided as a stand-by or auxiliary source of current supply. Systems of this type are old and well known in which voltage control or regulating means is provided which is jointly controlled by the load current and the battery charging current, the purpose of the control means being to maintain the battery in a properly charged condition during load variations while the main source of current supply is available.

In accordance with an important feature of my invention I provide an improved regulated system of this type in which the control is so arranged that the charging current to the battery during no load conditions is automatically regulated or controlled so as to compensate for changes or fluctuations in the main supply circuit voltage, as well as to control the voltage applied to the load circuit and battery during normal operation when there is load applied to the load circuit.

An object of my invention is to provide a new and improved electrical control system.

Another object of my invention is to provide a new and improved control arrangement for an electrical supply system containing a storage battery as an auxiliary source of current supply.

My invention will be better understood from the following description taken in connection with the accompanying drawings and its scope will be pointed out in the appended claims.

Figure 7:
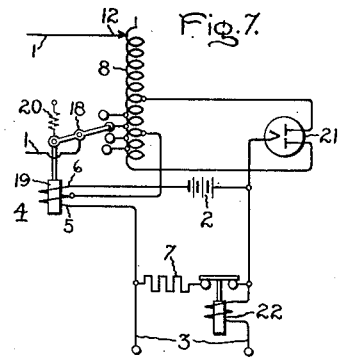
Figure 8:
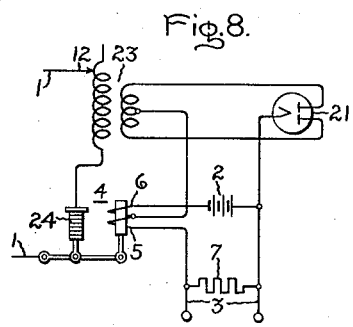
Figure 9:
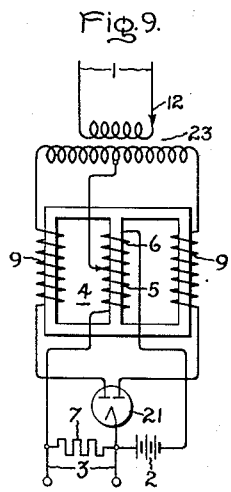
Figure 10:
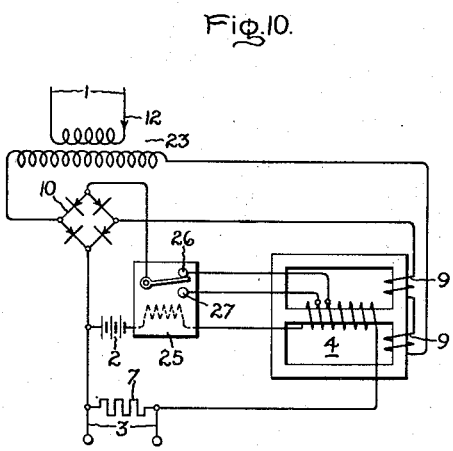

In the drawings, Fig. 1 is a simplified diagrammatic showing of the connections of the main elements of my invention; Figs. 2 and 3 illustrate the operating characteristics of my invention; Fig. 4 is one form of a complete embodiment of my invention; Fig. 5 shows a modified voltage controlling means in the form of a variable ratio saturating main transformer; Fig. 6 is a modification of Fig. 5 utilizing a somewhat similar transformer as an auxiliary bucking transformer; Fig. 7 is a modification showing a different form of rectifier and a different form of voltage control means; Fig. 8 is a further modification in which still another form of voltage control means is shown; Fig. 9 illustrates still another modified form of voltage control means and Fig. 10 shows a modification in which an ampere-hour meter is employed to control the trickle charging rate of the storage battery.

Referring now to the drawings and more particularly to Fig. 1, I have shown therein a direct current supply circuit 1 which may be energized from any suitable source of current supply (not shown) such as from a direct current source, or from an alternating current source through any suitable rectifier, several modifications of which are shown in later figures. In addition to the supply circuit, there is shown a storage battery 2 and both the supply circuit 1 and the storage battery 2 are connected so that they can supply current to a load circuit 3.

The circuit of Fig. 1 is provided with any suitable means for controlling or regulating the voltage applied by the supply circuit 1 to the battery 2 and to load circuit 3, but for the sake of simplicity and ease of understanding my invention the actual voltage control means has been omitted and only the control coil or winding 4 for this means has been shown in the figure. However, numerous examples of suitable types of voltage control means are shown in later figures. The regulator control coil or coils is divided into two parts 5 and 6, the connections being such that current from the supply circuit 1 flows through the coil 5 to the load circuit and flows through the coil 6 to charge the battery. The arrangement of the coils 5 and 6 is such that the effect of charging current flowing through the coil 6 is differential or in opposition to the effect of load current flowing through the section 5. As shown, one convenient way of securing this result is to connect the battery across the load circuit through the control coil or winding 4 and connect one side of the supply circuit to an intermediate point on the winding 4. However, the portions 5 and 6 of the winding may be entirely separate if desired and their magnetic effects may either be combined magnetically in one core or mechanically or magnetically in separate cores as desired, all that is necessary being that the coil sections 5 and 6 produce differential effects in response, respectively, to load current flowing from the supply circuit to the load and charging current flowing from the supply circuit to the battery. As will be explained more in detail later, it is also desirable that the coils 5 and 6 be so arranged that when discharge current is flowing from the battery to the load the effect is aiding and cumulative in both coils with respect to the regulator action.

In order to make the battery charging current substantially independent of supply voltage fluctuations during no load I connect an impedance 7 across the load circuit 3.

In the operation of Fig. 1 let it be assumed that a net increase in the ampere turns of the coils or winding 4, taken as a whole, tends to increase the voltage applied by the supply circuit to the battery and to the load circuit and a net decrease in ampere turns of the coil 4 tends to decrease this voltage. If now the voltage of the supply circuit is constant and the load is constant and the voltage applied to the battery is high enough to charge the battery, differential currents will flow in the windings 5 and 6. Assume now that battery 2 is substantially fully charged. Under these conditions the voltages and parts may be so arranged and proportioned that merely the proper trickle charge flows into the battery which is necessary to maintain it in a fully charged condition. The ampere turns produced by the load current flowing through the winding 5 minus the ampere turns produced by the battery trickle charging current flowing through the winding 6 will therefore produce definite net ampere turns which, under the first assumption in this paragraph, will control the voltage regulating means in a manner to maintain the voltage at this proper value if the ampere turns of coil 5 are normally greater than those of coil 6.

Another way of looking at the operation at this point is to consider that the battery is supplying all of the load current through the combined windings 5 and 6 and the supply circuit is charging the battery through the winding 6 at a rate which equals the discharge rate or load current plus a rate sufficient to make up for the internal losses in the battery. The difference between the discharge rate and the charging rate will in fact correspond to the trickle charge referred to in the previous paragraph. However, in looking at the operation from either point of view the effect on the control winding 4 will be the same and there will be a definite net ampere turns therein.

If now the load varies while the potential of the main source of current supply stays the same there will be an increase of load current flowing through the winding 5 which will tend to increase the net ampere turns in the winding 4 therefore tend to increase the voltage supplied to the battery and load circuit. This increase can be made to compensate for the increase in voltage drop in the supply circuit between the source of current supply and the battery and load so that the battery trickle charge will remain substantially the same as before.

If now the load should remain the same but the voltage of the source of current supply should vary then the trickle charging current to the battery and the load current would also increase as the voltage increased. However, due to the relatively low internal resistance of a storage battery the charging current will tend to increase at a greater rate than the load current thereby reducing the net ampere turns in the winding 4 as a whole because the ampere turns of the differential winding 6 will increase faster than the ampere turns of the winding 5. This will have an effect on the regulator such as to cause a reduction in voltage applied to the battery and load and the parts may be so arranged that over a considerable range of voltage fluctuation of the main source of supply the battery trickle charging current will remain substantially constant.

Sometimes no load is connected to the load circuit 3 over considerable periods of time and during these periods the voltage of the supply circuit 1 may vary appreciably. Ordinarily this would tend to produce relatively wide changes in the charging current of the battery 2. In order to regulate this charging current and maintain it substantially constant independent of reasonable voltage fluctuations on circuit 1 the impedance 7, shown by way of example as a resistor, is provided. This acts as an artificial load and by properly proportioning it with respect to the size and countervoltage of the battery and with respect to the relative turns of the winding sections 5 and 6 the battery trickle charging current can be made substantially independent of the voltage over a reasonable range of voltage fluctuation. The action is similar to the action when the supply voltage changes and a constant load is connected to the circuit. Thus, for example, if the voltage of the supply circuit 1 increases, the current through the artificial load 7 and the winding section 5 increases at a predetermined rate which, if the resistance 7 is an ordinary linear volt-ampere characteristic resistance, will be a linear increase in current whereas the battery current increases at a rate greater than the linear rate due to the relatively high counter voltage and low internal resistance of the battery. Consequently the differential effect of the winding 6 increases faster than the magnetizing effect of the main winding 5 thereby producing a net decrease in the energization of the winding 4 as a whole, thus tending to cancel the increase in voltage of the supply circuit 1 and holding it substantially constant as it is applied to the terminals of the battery.

When the supply circuit 1 fails as a source of supply for any reason, such as the blowing of a fuse or the tripping of a circuit breaker, the battery 2 will supply the load circuit 3 through the winding 4. The effect of this current through the winding sections 5 and 6 will of course be cumulative so far as the regulator is concerned but as the supply circuit is deenergized the regulator action is of no effect.

In Fig. 2 is shown the variation in charging current for variations in the supply voltage. The characteristic of the circuit of Fig. 1 is shown by the full line while the characteristic of a conventional battery charger of the unregulated type is shown by the dotted line. It will be seen that with my circuit the charging current remains substantially constant over a considerable range of variation in the supply circuit voltage while in a conventional battery charger the battery current varies widely over the same voltage range.

By varying the point where the supply circuit is connected to the winding 4 in Fig. 1 the relative number of turns of the winding sections 5 and 6 may be varied thereby to vary the charging current of the battery. In Fig. 3 the full lines show three charging characteristics corresponding respectively to three different points of connection of the supply circuit 1 to the winding 4 during times when the output of the system is varied. These three lines show that the input to the battery may be made to increase at different rates with variations in the output of the system so as to suit any type of battery. The dotted lines above and below the full lines indicate variations in battery charging current when the voltage of the supply circuit varies in the order of magnitude 10% above or below the value corresponding to the intermediate full line.

In the modification shown in Fig. 4 supply circuit 1 is an alternating current circuit, such for example as an ordinary commercially constant, moderately variable 110 or 115 volt single-phase circuit. The voltage of this circuit is stepped down by means of an auto-transformer 8, in series with the primary winding of which are the alternating current variable impedance windings 9 of a saturable core reactor. The control winding 4 is the direct current or saturating winding for this reactor. The reduced voltage output of the auto-transformer 8 is rectified by any suitable rectifier, such as the illustrated bridge-connected copper oxide rectifier 10.

Taps 11 are provided on the alternating current windings 9 of the reactor so as to adjust the impedance of this reactor in order to adapt the system for various types and sizes of storage batteries. By varying the tap connections the voltage drop across the variable impedance windings 9 of the reactor may be varied thereby inversely varying the voltage across the primary winding and hence across the secondary winding of the transformer 8.

In the operation of Fig. 4, when the net ampere turns of the direct current saturating or control winding 4 increase, the core (not shown) of the reactor becomes more nearly saturated thereby reducing the impedance of the variable reactance windings 9 of the reactor with the result that the division of the total voltage of circuit 1 between the alternating current windings of the reactor and the primary winding of the transformer changes so as to increase the transformer voltage and therefore increase the voltage at the output terminals of the rectifier 10. Similarly a decrease in the net ampere turns of the winding 4 will decrease the saturation of the reactor thereby causing the voltage across it to be a greater proportion of the total circuit voltage thereby decreasing the voltage of the transformer 8 and hence decreasing the voltage of the output of the rectifier 10. Consequently it will be seen that the effect of variations in net energization or ampere turns of the winding 4 on the voltage impressed upon the battery and load circuit is the same in Fig. 4 as in Fig. 1.

The transformer 8 is provided with taps 12 for varying its ratio so as to adapt the system to supply circuits of different normal voltage. The circuit of Fig. 4 may be made to have the same operating characteristics as the circuit of Fig. 1 with respect to variations in load or variations in supply voltage or both.

In the modification shown in Fig. 5 the transformer and regulating means are combined in a single device comprising a two-winding transformer with a core which is magnetically saturable by the control winding 4. As shown, this combined transformer and regulator has a core 13 of magnetically saturable material on which is wound a primary winding 14 and a secondary winding 15. The core 13 has a transverse path or leg on which is wound the direct current control or saturating winding 4. The arrangement is such that no net alternating flux passes through the core section on which the direct current winding 4 is wound so that no alternating voltage will be induced therein. The reason there is no such flux is because of the symmetrical arrangement of the primary and secondary windings of the transformer with respect to the leg carrying the winding 4. This arrangement prevents any unbalanced alternating magnetomotive force from acting on the center leg.

An additional direct current saturating winding 16 is wound on the same part of the core as the winding 4 and the winding 16 is energized in a substantially constant manner by any suitable means such as connecting it across a battery. Its magnetic action is opposite to the net ampere turns of the winding 4 so that when the net ampere turns of the winding 4 are a minimum the winding 16 substantially saturates the core 13 thereby increasing to a maximum the leakage flux of the transformer whereby the voltage output of the secondary winding is a minimum.

In operation, as the net ampere turns of the winding 4 increase there is a decrease in saturation in the core 13 thereby decreasing the leakage flux and increasing the mutual inductance of the transformer windings and hence increasing the voltage of the secondary winding 15. Therefore the action of the winding 4, as a whole, in Fig. 5 is the same as in Fig. 1. This, of course, also means that the interaction of the winding sections 5 and 6 is the same as in Fig. 1 so that the battery receives proper charging current under all normal variations in load and supply circuit voltage.

As the proper operation of Fig. 5 requires an increase in unidirectional saturating flux in order to reduce the voltage of secondary winding 15 and vice versa, I can also secure this operation by omitting winding 16 and reversing the relative strengths of the winding sections 5 and 6. Thus if the ampere turns of section 6 are greater than the opposing ampere turns of section 5 the unidirectional saturating flux will decrease if the load increases and will increase if the supply voltage increases, and these changes will cause an increase and decrease, respectively, in the voltage of secondary winding 15. Hence proper regulation can easily be secured in this manner.

Another feature of Fig. 5 is that the connections of resistor 7 are controlled by a switch 17 so that when the load circuit is closed the resistance 17 is disconnected whereas when the load circuit is opened by the switch 17 the resistor 7 will be connected across the load circuit. Such an arrangement eliminates the losses in the resistance 7 at times when load is applied to the circuit 3.

In Fig. 6 the transformer of Fig. 5 is connected as an auxiliary bucking auto-transformer in that the primary winding 14 is connected across the supply circuit 1 and the secondary winding 15 is connected in the supply circuit 1 so as to oppose or buck the voltage of the latter. The relation of winding sections 5 and 6 is the same as in Fig. 1 so that an increase in load causes an increase in unidirectional saturating flux thereby reducing the bucking voltage of winding 15 and increasing the voltage applied to the load and battery. Similarly, an increase in voltage of supply circuit 1 causes a decrease in unidirectional saturating flux thus increasing the bucking voltage of secondary winding 15 and counteracting the rise in supply circuit voltage.

In the modification shown in Fig. 7 the regulating means is in the form of transformer tap changing apparatus comprising a tap changing switch 18 which may be operated by any well known means and which, for the sake of simplicity, is shown as a simple solenoid actuating means 19 controlled by the winding 4. A spring 20 opposes the pull of the solenoid 19 and acts to move the switch to the low voltage position when the winding 4 is deenergized. Consequently, an increase in the net ampere turns in the winding 4 causes the transformer 8 to increase the voltage of its output thereby to compensate for increases in load or decreases in the supply voltage as in the previous figures. In Fig. 7 the rectifier 21 is of the bi-phase vacuum tube type instead of the bridge connected copper oxide rectifier type as in Figs. 4 and 5. The rectifier 21 may be either of the high vacuum or gas or vapor filled type and if it has a hot cathode the cathode heating current may be obtained in any well known and conventional manner. In Fig. 7 there is also provided a load responsive relay 22 for controlling the connections of the resistance 7. The arrangement is such that at no load and when no current is flowing through the relay 22 resistance 7 is connected across the load circuit whereas as soon as load is applied to the circuit 3 the current will cause the energization of the relay 22 thereby automatically disconnecting the resistance 7. In this manner any losses in resistance 7 will be eliminated automatically during such times as load is applied to the circuit 3.

In Fig. 8 an ordinary two-winding insulating transformer 23 is employed and the regulating means consists of a variable impedance or resistance device such for example as a pressure responsive carbon pile resistor 24 connected in series with the primary winding of the transformer 23. By a suitable system of levers and a magnet core the winding 4 may be made to control the value of resistance or impedance of the device 24 in any well known manner. The arrangement is such that when the net ampere turns of the winding 4 are a minimum the impedance of the device 24 is a maximum so that most of the voltage of the supply circuit is across it and the voltage applied to the transformer is a minimum. However, as current to the load circuit 3 increases and the net ampere turns of the winding 4 increase the impedance of the device 24 decreases thereby causing a greater percentage of the voltage to be applied across the primary winding of the transformer 23 thereby compensating for voltage drops in the supply circuit. The differential winding 6 carrying the battery current also operates the same as in the other figures so as to secure proper battery charging in response to changes in load or changes in supply voltage.

In Fig. 9 the variable impedance windings 9 of a regulating saturable reactor, such for example as the type shown in Fig. 4, are connected in the half wave pulsating current circuit derived from the anodes of the rectifier 21. The winding 4 is connected as in the other figures so that the winding section 5 carries the load current and the winding section 6 carries the battery current. I have found that this arrangement operates in a very satisfactory manner even though alternating current does not flow through the windings 9. The pulsating half-wave current flowing through these windings sets up self-induced counter-electromotive forces which are equivalent to the variable impedance effects when the windings carry alternating current. The control or regulating action in Fig. 9 is similar to that of the other figures and should be obvious from the descriptions thereof which have already been given.

In Fig. 10 the variable impedance windings 9 of the saturable reactor are connected between the secondary winding of the transformer 23 and the input terminals of the bridge-connected rectifier 10. The principal feature of this modification is the application of a device responsive to the state of charge of the battery 2 for controlling the taps or connection points of one of the output terminals of the rectifier 10 to the intermediate point on the control winding 4. This device is shown schematically as an ampere-hour meter 25 and the arrangement is such that if the supply circuit voltage has been off long enough, at a time when load is applied to the load circuit 3 and the battery 2 has been discharged a predetermined amount during this time, the ampere-hour meter 25 will move a set of contacts so as to change the intermediate point to which the rectifier output connects to the winding 4. For example, in the position shown in the drawing, the ampere-hour meter is making contact with the contact 26 whereas if it moves to the contact 27 the connection point to the winding 4 of the rectifier output will be changed so as to increase the charging rate of the battery. In this manner the battery which has become fairly well discharged will be brought up to full charge relatively rapidly and when it is substantially fully charged the ampere-hour meter will change over so as to reduce the charging rate to the trickle charge required to maintain the battery in its fully charged condition.

While I have shown and described particular embodiments of my invention, it will be obvious to those skilled in the art that changes and modifications may be made therein and I, therefore, aim in the appended claims to cover all such changes and modifications as fall within the true spirit and scope of my invention.

What I claim as new and desired to secure by Letters Patent of the United States is:

1. In an electrical energy supply system, a storage battery, a load circuit, a source of current supply one side of which is connected to one side each of said battery and said load circuit, means including a plurality of coil turns for controlling the voltage of said source of current supply, said battery being connected across said load circuit through said coil turns, the other side of said source of current supply being connected to said coil turns at a point electrically intermediate the points thereon which are connected to said battery and load circuit respectively, said coil turns being so wound that the effect produced thereby by the flow of charging current into said battery opposes the effect produced by the flow of current from said source to said load circuit, and an impedance adapted to be connected across said load circuit during no load condition thereon.

2. In an electrical energy supply system, a storage battery, a load circuit, a source of current supply one side of which is connected to one side each of said battery and said load circuit, means including a plurality of coil turns for controlling the voltage of said source of current supply, said battery being connected across said load circuit through said coil turns, the other side of said source of current supply being connected to said coil turns at a point electrically intermediate the points thereon which are connected to said battery and load circuit respectively, said coil turns being so wound that the effect produced thereby by the flow of charging current into said battery opposes the effect produced by the flow of current from said source to said load circuit, and an impedance adapted to be connected across said load circuit during no load conditions thereon, said impedance being so correlated to said turns that the effect produced by the turns carrying the current which flows through said impedance normally predominates over the effect produced by the turns carrying battery charging current.

3. In combination, an electrical supply circuit, a battery and a load circuit both connected to receive current from said supply circuit, differentially acting means responsive respectively to the battery charging and load currents for controlling the voltage applied by said source to said battery and load circuit, and an impedance adapted to be connected to cause a current flow in the load circuit responsive portion of said differentially acting means during no load conditions on said load circuit.

4. In an electric current supply system, a commercially constant but moderately variable potential current source, a storage battery, a load circuit, a saturable reactor connected to regulate the potential of the current supplied by said source to said battery and load circuit, a winding on said reactor for controlling the saturation thereof, said load circuit and said battery being connected to said source through different portions of said winding in such a way that the magnetizing effect on said reactor of charging current flowing into said battery is opposite to the magnetizing effect of current flowing from said source to said load circuit, and an impedance adapted to be connected across said load circuit during no load conditions thereon, said impedance being so correlated to the turns of the two portions of said winding that normally the ampere-turns of the portion of said winding which carries battery charging current are less than the ampere-turns of the other portion of said winding.

5. In combination, an alternating current supply circuit, a transformer having its primary winding connected thereto, a bi-phase rectifier, a saturable reactor having variable impedance windings connected between the input terminals of said rectifier and the secondary winding of said transformer, a load circuit, a storage battery connected across said load circuit through a direct current saturating winding on said reactor, one output terminal of said rectifier being connected to one side each of said battery and load circuit, the other output terminal of said rectifier being connected to an intermediate point on said direct current saturating winding, and an impedance adapted to be connected across said load circuit during no load conditions thereon.

6. In combination, an electrical supply circuit, a load circuit and a battery connected to receive current from said supply circuit, means controlled jointly by the battery and load currents for controlling the voltage applied by said supply circuit to said battery and load circuit, and means responsive to the state of charge of said battery but independent of the voltage of said battery for controlling its charging rate.

7. In combination, an electrical supply circuit, a load circuit and a battery connected to receive current from said supply circuit, means controlled jointly by the battery and load currents for controlling the voltage applied by said circuit to said battery and load circuit, and means responsive to the state of charge of said battery but independent of the voltage of said battery for varying the effect of the battery charging current on said voltage control means.

8. In combination, an alternating current supply circuit, a rectifier having input terminals connected to said supply circuit and having output terminals, a storage battery, a saturable reactor having a direct current saturating winding, a load circuit connected across said battery through said direct current saturating winding, one rectifier output terminal being connected to one side each of said battery and load circuit, a plurality of intermediate taps on said direct current winding, means responsive to the state of charge of said battery for controlling the connection of the other output terminal of said rectifier to one or the other of said taps depending upon the state of charge of said battery, and a variable impedance winding on said reactor connected to control the voltage applied by said rectifier to said battery and load circuit.

9. In combination, an alternating current supply circuit, a rectifier having input terminals connected to said supply circuit and having output terminals, a storage battery, a saturable reactor having a direct current saturating winding, a load circuit connected across said battery through said circuit connected across said battery through said direct current saturating winding, one rectifier output terminal being connected to one side each of said battery and load circuit, a plurality of intermediate taps on said direct current winding, means responsive to the state of charge of said battery for controlling the connection of the other output terminal of said rectifier to one or the other of said taps depending upon the state of charge of said battery, and a variable impedance winding on said reactor connected to control the voltage applied by said rectifier to said battery and load circuit, and an impedance adapted to be connected across said load circuit during no load conditions thereon.

10. In combination, a rectifier, a saturable core reactor for regulating the output voltage of said rectifier, a winding for controlling said reactor, a battery and a load circuit connected to receive current from said rectifier through mutually exclusive differentially acting turns of said winding, the effect of the turns traversed by load circuit current normally predominating over the effect of the turns traversed by battery current.

RALPH D. AMSDEN.